March 31, 1936. E. A. ROCKWELL ET AL 2,035,922
POWER BRAKE SYSTEM FOR MOTOR VEHICLES
Filed April 23, 1932 3 Sheets-Sheet 1
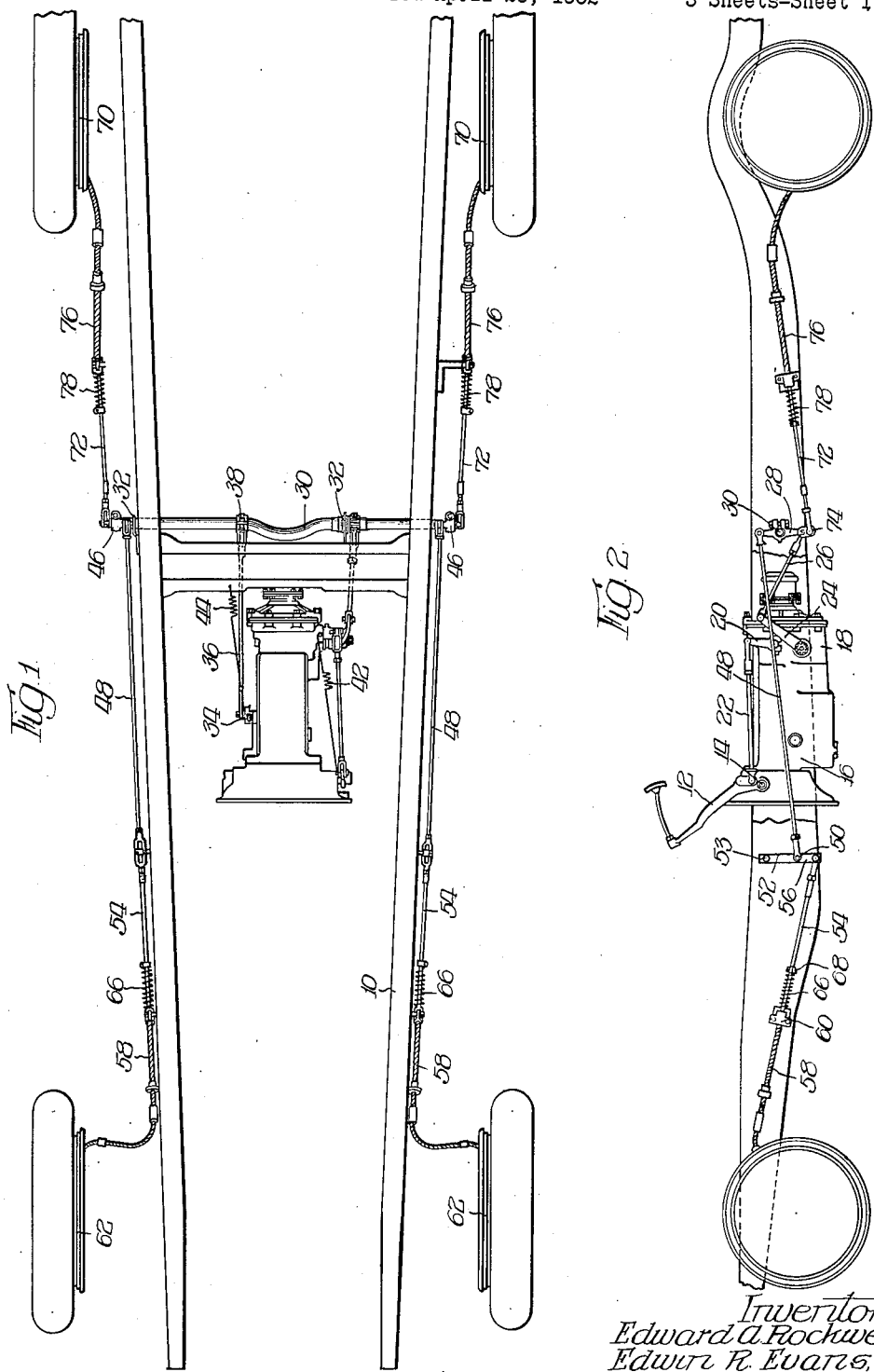
Inventors:
Edward A. Rockwell,
Edwin R. Evans, March 31, 1936.  E. A. ROCKWELL ET AL  2,035,922
POWER BRAKE SYSTEM FOR MOTOR VEHICLES
Filed April 23, 1932   3 Sheets-Sheet 2
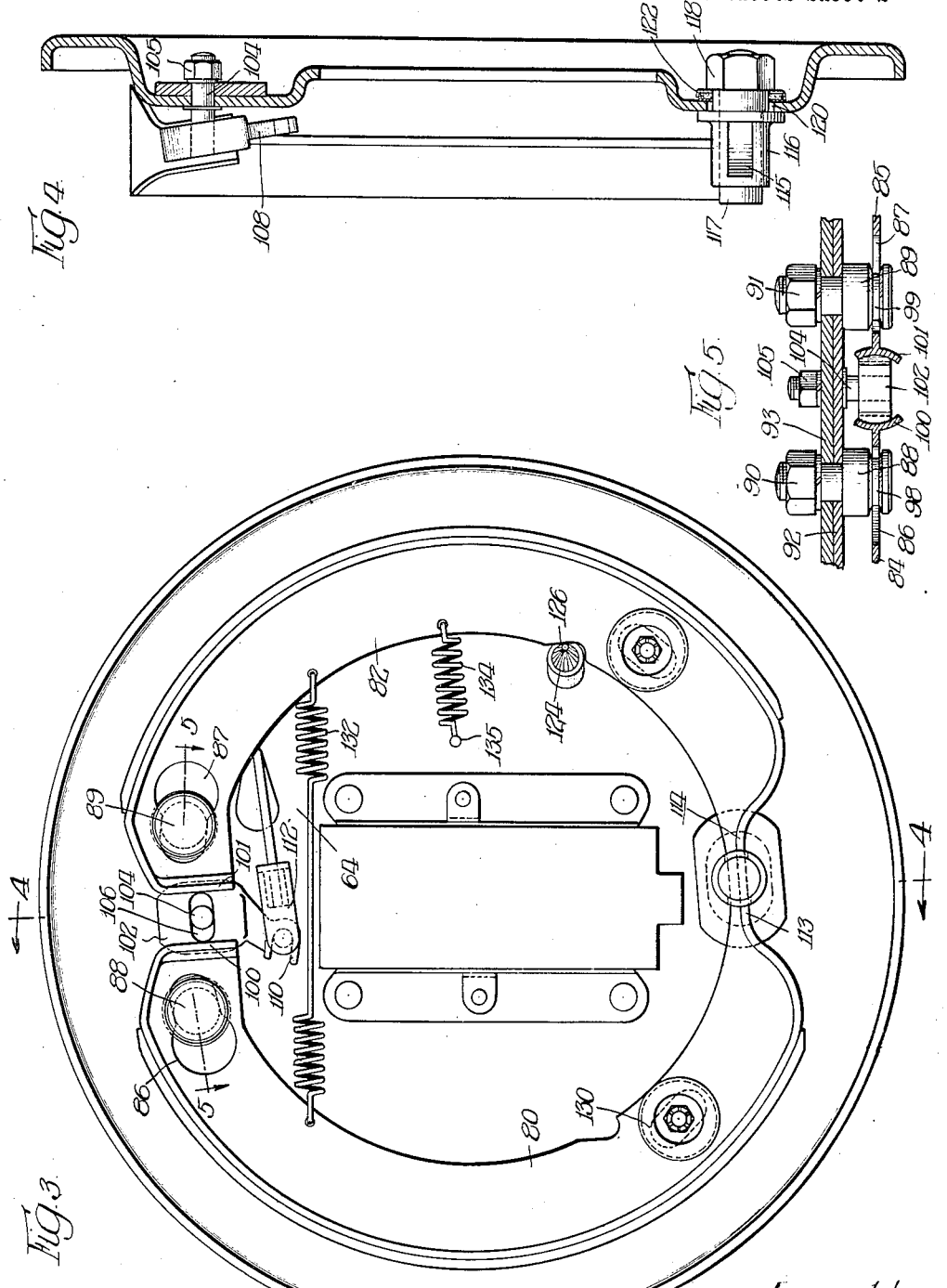
Inventors
Edward A. Rockwell,
Edwin R. Evans March 31, 1936. E. A. ROCKWELL ET AL 2,035,922
POWER BRAKE SYSTEM FOR MOTOR VEHICLES
Filed April 23, 1932 3 Sheets-Sheet 3
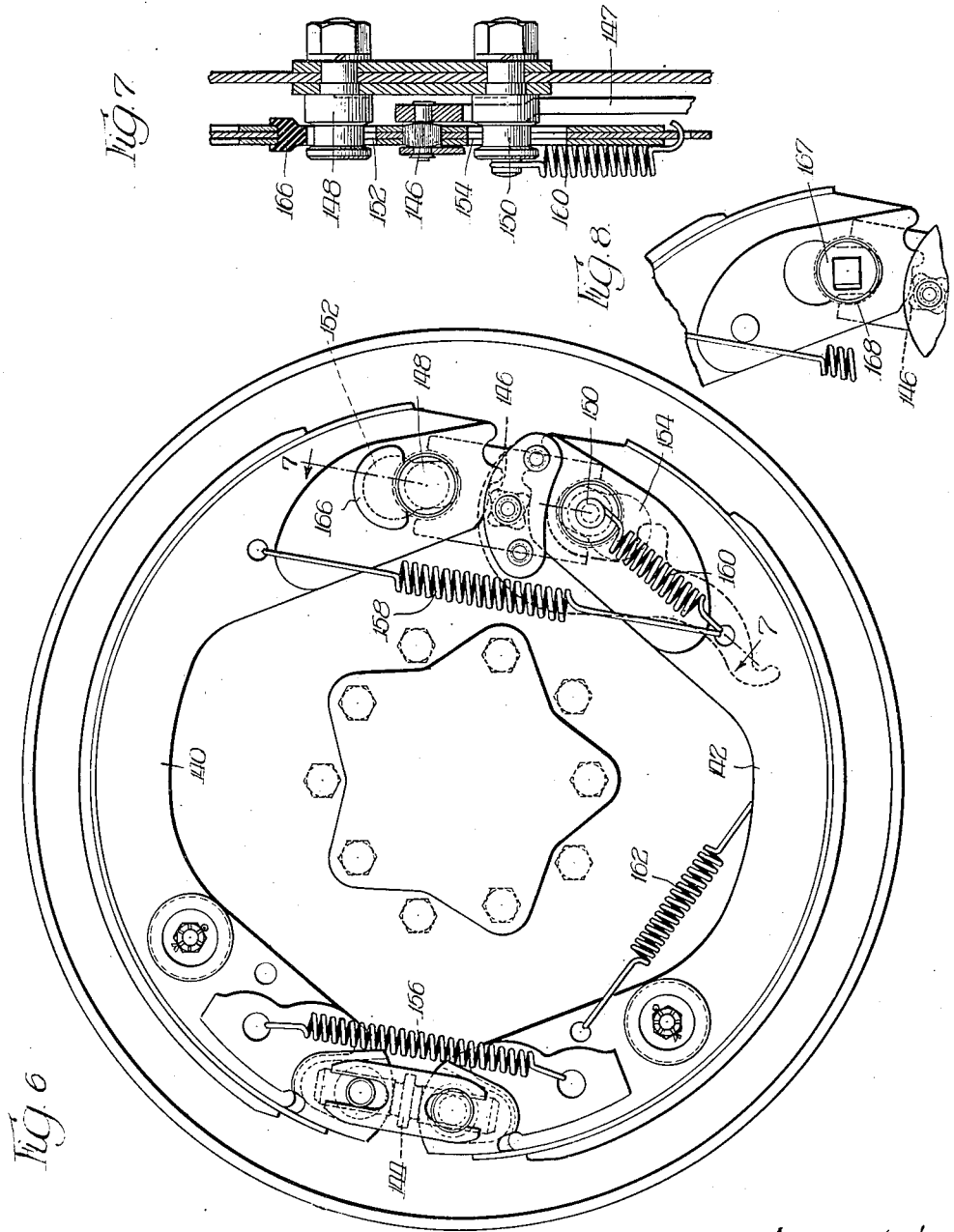
Inventors
Edward A. Rockwell
Edwin R. Evans
By Wilkinson Huxley Byron & Knight
Attys Patented Mar. 31, 1936

2,035,922

UNITED STATES PATENT OFFICE 2,035,922

POWER BRAKE SYSTEM FOR MOTOR VEHICLES

Edward A. Rockwell and Edwin R. Evans, Chicago, Ill.

Application April 23, 1932, Serial No. 607,038

10 Claims. (Cl. 188—78)

This invention relates to improvements in power brake systems for motor vehicles and particularly in a system in which the entire force from the power brake is equally and evenly distributed to the brake shoes of the four-wheel brakes of the vehicle.

It is well recognized that a wheel brake of the type called a "full unwrapped brake" is more desirable in obtaining an even distribution of braking pressure and therefore an even wear on the brake lining than a wheel brake of the self-energized or servo type in which high localized braking pressures are developed on the wrapped shoes, which are forced on by a pressure greater than that applied to the brakes due to the wrapping effect obtained by the rotation of the brake drum to which the braking is applied. The localized pressures in self-energized and servo type wheel brakes increase proportionate to the increased speed of the vehicle. Therefore, if the vehicle is braked when traveling at a very high rate of speed, injury to the wheel brakes due to the uneven wear of the brake lining will result. However, the full unwrapped wheel brake has not been used with an ordinary pedal-operated brake linkage since sufficient leverage cannot be obtained to develop the desired amount of braking pressure without having a relatively long travel of the brake linkage. Also the provision of reserve travel to compensate for the wear of brake lining requires a longer pedal travel than desirable. Self-energized wheel brakes can be arranged to develop sufficient braking pressure with direct pedal actuation and sufficient reserve travel is provided due to the movement of the energized brake shoes.

It is a purpose of the present invention to avoid the objectionable features of the self-energized type of wheel brake by employing unwrapped wheel brakes and to maintain a relatively short pedal travel by using a power brake which will be operative to develop the desired amplification of the braking pressures with a travel of the brake linkage independent of the pedal. Therefore, the power brake proportionately amplifies the pedal pressure and evenly distributes the amplified force to the wheel brakes so that a very accurate control of the braking pressure is obtained by the operator.

It is further an object of the invention to improve upon standard brake systems employing self-energized wheel brakes by modifying the wheel brakes to make them normally energized brakes, that is, in which one shoe is wrapping and the other is unwrapping when the brake is applied, and to use a power brake for actuating the wheel brakes. This modification prevents a servo effect of the wheel brakes and therefore eliminates localized pressure to some extent, but not as much as when full unwrapped wheel brakes are employed.

It is further an object of the invention to disclose improvements according to which a standard type of servo brake may be modified to a full unwrapped brake without material change in the construction.

Further and additional features of the present invention will be more readily apparent from the following description taken in connection with the attached drawings, in which—

Figure 1 is a plan view of the chassis and brake linkage;

Figure 2 is a side elevation of the linkage shown in Figure 1;

Figure 3 is an elevation of a front wheel brake which may be employed in the system disclosed in Figures 1 and 2;

Figure 4 is a vertical section of Figure 3 taken on the plane indicated 4—4;

Figure 5 is a detail section of Figure 3 taken on the plane indicated 5—5;

Figure 6 is an elevation showing a modified design of wheel brake;

Figure 7 is a detail section on the plane indicated 7—7 in Figure 6, and

Figure 8 is a detail view illustrating a further modification of the design shown in Figure 1.

Referring first to Figures 1 and 2 there is shown a chassis frame 10. A pedal 12 is pivoted at 14 on a transmission housing 16. Immediately in rear of the transmission housing the power brake housing 18 is positioned concentric with respect to the propeller shaft of the vehicle. The power brake may be of a design such as illustrated in the Rockwell and Garancher application, Serial No. 519,999, filed March 4, 1931. The pedal 12 is connected to the input lever 20 of the power brake by a link 22. The output lever 24 of the power brake is connected by link 26 to a depending lever 28 secured to the rock shaft 30, which is supported in suitable bearings 32—32 on the chassis frame. It will be understood that the movement of the brake pedal 12 will produce actuation of the power brake in such a manner that the rotation of the propeller shaft, through movement of the vehicle, will serve to amplify the input pressure to the power brake and deliver the amplified pressure through the output lever for rotating the rock shaft 30.

The rock shaft 30 may be operated by manual control through an emergency lever 34 and a pull rod 36 having lost motion connection with a lever 38 secured to the rock shaft 30. The pedal is held normally in released position by a pullback spring 42 and the emergency lever is similarly held in released position by spring 44.

Upon each end of the rock shaft 30, outside of the chassis frame, are mounted double arm distributing levers 46 connected at their upper ends to forwardly extending pull rods or cables 48 which are connected as at 50 to relay levers 52, pivoted at 53 on the chassis frame. Front wheel brake actuating cables 54 are secured by connections 56 to the lower ends of the levers 52.

The cables 54 extend through flexible conduits 58 which are attached at their rear ends to brackets 60 secured to the chassis and are attached at their forward ends to the front brakes 62. Pull back springs 66 are employed tensioned between the brackets 60 and connections 68 to the cables 54 whereby the springs 66 serve to feed the cables through the conduits 58 upon release of the brakes.

It is much more desirable to have the pull-back springs for the cables outside of the brakes, as shown, rather than inside the wheel brakes, as is customary practice since the pull-back springs, as in the present design, serve to directly feed the cables into the conduits and increase the efficiency by avoiding friction on the sides of the conduit due to the bends therein. When the pull-back springs are inside the brakes they impart an increased resistance when the brakes are being applied due to pulling over the bends in the conduits.

Connections are made from the rock shaft 30 to the rear wheel brakes 70 in a similar manner by connecting the rear brake cables 72 at 74 to the lower ends of the distributing levers 46. The cables 72 feed through conduits 76 and pull-back springs 78 are used similar to the pull-back springs 66 at the front.

It is a purpose of the present invention to employ a brake linkage such as illustrated in Figures 1 and 2, including a power brake, with wheel brakes which are fully unwrapping at least during the forward travel of the vehicle. Various designs may be resorted to for the construction of the unwrapping wheel brakes but we have shown, in Figures 3, 4 and 5, a simple construction of an unwrapping wheel brake and in Figures 6, 7 and 8 a modified design which may be employed by merely making slight changes in a standard design of servo type of wheel brake.

Figures 3, 4 and 5 show a wheel brake structure including brake shoes 80 and 82. The shoes are substantially T-shaped in section and the webs 84—85 of the shoes are provided with keyhole-shaped openings 86—87 serving as a support for the shoes by receiving anchors 88 and 89, which are attached by nuts 90 and 91 to the backing plate 92 and a metal plate 93. The openings 86—87 admit the heads of the anchors 88—89 through the enlarged portion thereof and the annular recesses 98—99 of the anchors fit into the reduced portion of the openings 86—87 in the brake shoes. The flanges of the shoes are bent, as shown at 100—101 to form thrust-receiving portions contacting with the actuating cam 102. As shown in Figures 4 and 5 the ends 100—101 are cylindrically shaped and lie a slight angle with respect to the median planes of the shoes. This particular formation is not material to the present invention but the shoe is formed in this manner to be similar to the brake shoes shown and described in the Evans application, Serial No. 522,835, filed March 16, 1931. The cam 102 is supported against displacement by a pin 104 carried by the backing plate and secured by nut 105, as shown in Figures 4 and 5. The cam is free to float laterally with respect to the pin 104 by the provision of a slot 106 receiving the pin 104. The cam has an integral lever arm 108 formed with a yoke-shaped slot 110 for connection to a clevis 112 secured to a brake actuating cable 54.

The opposite ends of the brake shoes are formed with flattened ends 113—114 fitting within slots 115 in a bracket 116 to engage an axially slidable wedge 117 which is moved by nut 118 threaded to the wedge 117 on the exterior of the backing plate. The nut 118 therefore holds the shoes 80—82 and the bracket 116 against the backing plate 64 but a slight relative movement is permitted by the provision of a clearance opening 120, which is shown in Figure 4 to be larger than the bracket. The clearance opening 120 is sealed against the entrance of foreign matter by the packing 122. The brake shoes may therefore be adjusted by movement of the wedge through turning the nut 118 and the shoes may be centered with respect to the brake drum by a centralizer pin 124 extending through the backing plate and engaging by its conical end a notch 126 in the web of one of the shoes. The devices shown at 128 are anti-rattling means for holding the shoes against movement laterally with respect to the backing plate. By reason of clearance slots 130 the shoes are free to move circumferentially with respect to the brake drum.

The forward rotation of the brake drum cooperating with the shoes could be counter-clockwise in Figure 3 which results upon actuation of the brake in producing an unwrapping action of both shoes 80 and 82, since the shoe 80 upon actuation of the cam will abut the anchor pin 88 and the shoe 82 will tend to move out of abutment with the anchor pin 89. The pull upon the cable 54 producing a turning movement of the cam will be opposed to the full reaction of the brake shoes. A similar action will occur when the drum is rotating in the opposite direction except that the anchor pin 89 will constitute an abutment for both shoes. The shoe 80 will be free to move with respect to its anchor pin 88. Since the usual application of the brake shoes will be during forward travel of the vehicle, the springs which normally hold the shoes in released position will be so arranged as to normally hold the shoe 80 in contact with the anchor pin 88. For example there may be a spring 132 extending between the shoes 80 and 82 and an additional spring 134 extending between a connection 135 to the backing plate and the brake shoe 82. The spring 134 will act to move the shoe 82 and the cam 102 until the shoe 80 abuts against the anchor 88.

A somewhat modified construction is illustrated in Figures 6, 7 and 8. In these figures there are shown a pair of brake shoes 140—142, the free ends of which are connected by adjusting means 144, while the thrust-receiving ends contact the star wheel 146 actuated by lever 147. The anchors 148 and 150 correspond to the anchors in Figure 5 and are received by the keyhole-shaped openings 152—154 of the brake shoes. The brake shoes are held in released position by the pull-back springs 156—158 which extend between the shoes and in addition the shoe 140 is normally held in contact with the anchor 148 by a spring 160 connected between the shoe 142 and the anchor pin 150. In addition a spring 162 may be connected between the backing plate and the shoe 142 to prevent rattling.

Forward rotation of the brake drum in a counter-clockwise direction in Figure 6 will produce an unwrapping effect of the shoes with respect to the anchor 148. The rotation of the star wheel 146 will therefore receive the full reaction of the brake shoes. In order to prevent an undesirable click caused from the brakes being applied in reverse travel of the vehicle, a rubber piece 166 may be supported at one end of the opening 152 so as to prevent noise when the abutment of the shoes changes to the anchor 150.

To allow full expansion of the shoes the anchor pins 148 and 150 may be formed square, as shown in Figure 8, to receive bushings 167 having slotted openings 168. The toes of the shoes may then move into full engagement with the brake drum.

The construction shown in Figures 6, 7 and 8 is a modification of a standard type of servo brake in which the slots in the brake shoes are so designed that the shoe will wrap towards the anchor pin, whereas as above described, the slots or openings 152—154 are so designed that the shoes unwrap away from the anchor pin and therefore tend to oppose expansion of the shoes by the cam and result in an even distribution of the braking pressure over the entire surface of engagement between the shoes and the brake drum.

We claim:

1. In a braking system for motor vehicles, wheel brake mechanism including full floating friction elements, anchoring means for the friction elements, said friction elements being adapted to move freely upon brake application into positions of unwrap with respect to the anchorage means and pedal controlled amplifying power braking means for actuating the wheel brake mechanism.

2. In a braking system for motor vehicles, wheel brake mechanism including full floating friction elements, a pair of anchors for said elements, said friction elements being free to move upon brake application in either direction of vehicle movement into positions of full unwrap with respect to one of said anchors and pedal controlled power brake means for actuating the wheel brake mechanism.

3. In a braking system for motor vehicles, wheel brake mechanism including a pair of brake elements, a rotatable cam between adjacent ends of said brake elements, means connecting the other ends of said brake elements, a pair of anchor pins adjacent the rotatable cam, each of said brake elements having a slotted opening receiving one of said anchor pins, said brake elements being free to move on brake application into positions such that the brake elements tend to move in response to the braking reaction towards the cam which receives the full braking reaction and pedal-controlled power braking mechanism for actuating said cam.

4. In a braking system for motor vehicles, a plurality of wheel brakes, each of said wheel brakes being designed to be fully unwrapping upon application in either direction of vehicle movement and pedal controlled power braking means for applying said wheel brakes.

5. Wheel brake mechanism comprising a backing plate, a pair of brake elements supported by said backing plate, a rotatable cam between adjacent ends of said brake elements, means connecting the other ends of said brake elements, said last-named means being free for circumferential movement with respect to said backing plate, a pair of anchor pins supported by said backing plate, each of said brake elements having a slotted opening for receiving one of said anchor pins, said slotted openings being so designed that upon brake application the brake elements abut against one of said anchor pins in a direction for movement away from the anchor by the braking reaction.

6. Brake mechanism comprising a backing plate, a pair of brake elements supported by said backing plate, a rotatable cam in thrust engagement with adjacent ends of said brake elements, adjusting means movably connecting the other ends of said brake elements, said adjusting means being free to move circumferentially with respect to said backing plate, a pair of anchor pins supported by said backing plate adjacent said cam, each of said brake elements having a slotted opening receiving one of said anchor pins, said slotted openings being so designed that upon brake application the brake elements abut against one of said anchor pins and transmit the entire brake reaction to the rotatable cam.

7. In a braking system for motor vehicles, a brake pedal, mechanical power braking means for amplifying the pedal pressure and wheel brakes actuated by the amplified pedal pressure, said wheel brakes including full floating friction elements tending to be moved towards released positions by the rotation of the retarded wheels whereby the pedal pressure is a substantially uniform proportion of the brake reaction.

8. In a braking system for motor vehicles, a brake pedal, mechanical power braking means for amplifying the pedal pressure and wheel brakes having linkage for operating the same actuated by the amplified pedal pressure, said wheel brakes including full floating friction elements, anchorage means for said friction elements and means permitting movement of said friction elements by the rotation of the retarded wheels in directions away from the anchorage means, whereby the pedal pressure is a substantially uniform proportion of the brake reaction.

9. Braking mechanism comprising a rotatable brake drum, a non-rotatable backing plate, a pair of brake shoes supported by said backing plate within said brake drum, a rotatable and laterally movable brake applying cam carried between adjacent ends of said brake shoes, a connection between the opposite ends of said brake shoes movable with respect to said backing plate and anchoring means for said shoes fixed with respect to said backing plate, said shoes being movable by the braking action in either direction of drum rotation into engagement with said anchoring means at one end of one shoe for tensile reaction away from said anchoring means and into compressive thrust engagement with said cam at the adjacent end of the other shoe.

10. Braking mechanism comprising a rotatable brake drum, a non-rotatable backing plate, a pair of brake shoes supported by said backing plate within said brake drum, a rotatable and laterally movable brake applying cam carried between adjacent ends of said brake shoes, a connection between the opposite ends of said brake shoes movable with respect to said backing plate upon actuation of said shoes and independently effective anchoring means fixed with respect to backing plate disposed on opposite sides of said cam, said shoes being movable by the braking action in either direction of drum rotation into engagement with the anchoring means at one side of said cam for tensile reaction away from said anchoring means and into compressive thrust engagement against the opposite side of said cam whereby said shoes are non-energized by the drum rotation.

EDWIN R. EVANS.
EDWARD A. ROCKWELL.